STABILIZATION OF OSCILLATORS FROM HIGH FREQUENGY STANDARDS

Filed April 2, 1951 3 Sheets-Sheet 1

INVENTOR
Lowell E. Norton
BY
J. L. Whittaker
ATTORNEY

STABILIZATION OF OSCILLATORS FROM HIGH FREQUENGY STANDARDS

Filed April 2, 1951

3 Sheets-Sheet 2

INVENTOR
Lowell E. Norton
BY J. L. Whittaker
ATTORNEY

STABILIZATION OF OSCILLATORS FROM HIGH FREQUENGY STANDARDS

Filed April 2, 1951 3 Sheets-Sheet 3

INVENTOR
Lowell E. Norton
BY J. L. Whittaker
ATTORNEY

United States Patent Office 2,743,368

Patented Apr. 24, 1956

2,743,368

STABILIZATION OF OSCILLATORS FROM HIGH FREQUENCY STANDARDS

Lowell E. Norton, Princeton, N. J., assignor to Radio Corporation of America, a corporation of Delaware Application April 2, 1951, Serial No. 218,808

15 Claims. (Cl. 250—36)

This invention relates to frequency-stabilization of oscillators, and particularly relates to utilization of molecular resonance exhibited by various gases to control the phase of feedback sustaining the generation of oscillations.

This application is a continuation-in-part of applications Serial Nos. 5,603 and 140,813 respectively filed January 31, 1948, and January 27, 1950. The former application is now Patent No. 2,559,730; and the latter is now abandoned.

It is a primary object of the invention to control the operating frequency of an oscillator by reactance effects exhibited by a frequency standard, such as a spectral line of a gas or a high Q resonator, at a resonance frequency substantially higher than the oscillator frequency.

In accordance with the present invention, the oscillator frequency is multiplied to derive higher frequency signals, the frequency of one of which coincides with the resonant frequency of a high Q standard when the oscillator is operating at its desired frequency. After this one higher frequency signal has been passed by the standard which is preferably a body of gas exhibiting molecular resonance, it is combined with another of the derived signals to produce a control or feedback signal whose phase angle rapidly changes in opposite senses upon departure of the oscillator frequency in opposite directions from its desired value.

More particularly, the output of the oscillator to be stabilized is impressed upon two channels respectively including frequency multipliers or harmonic generators to produce two harmonics of order differing by unity; one of the channels also includes a high-frequency standard, preferably a body of molecularly resonant gas which, because of the dispersion property accompanying absorption, exhibits rapidly changing reactance for deviations of the impressed harmonic frequency. The two channels provide inputs for a mixer whose output includes a difference-frequency equal to the oscillator frequency and of phase controlled by the standard. This difference-frequency is applied as feedback sustaining generation of oscillations stabilized at a sub-harmonic of a resonant frequency of the gas or other high Q microwave standard. The invention may be applied in stabilization of various types of oscillators having an external feedback loop, such as klystrons, beam deflection tubes, high-frequency triodes, traveling wave tubes and the like by inclusion of the frequency multipliers, frequency standard and mixer in the feedback loop.

The invention further resides in frequency-stabilizing methods and arrangements having features of novelty and utility hereinafter described and claimed.

Figure 1:
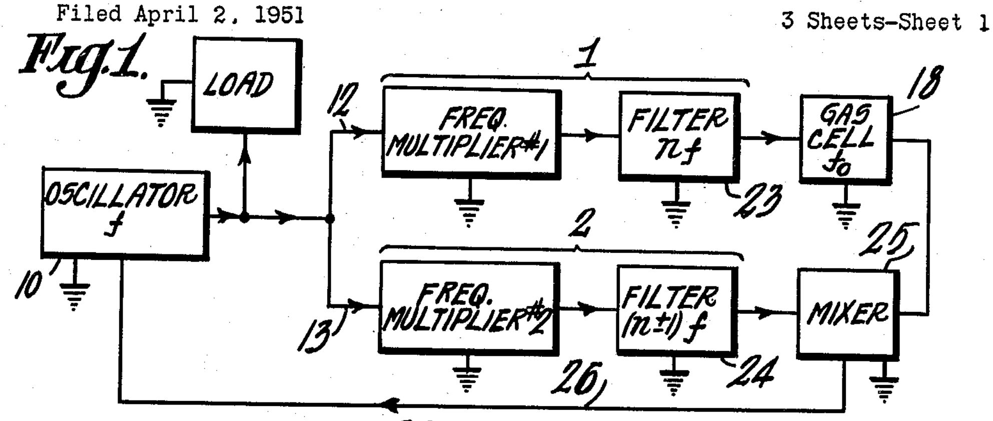
Figure 2:
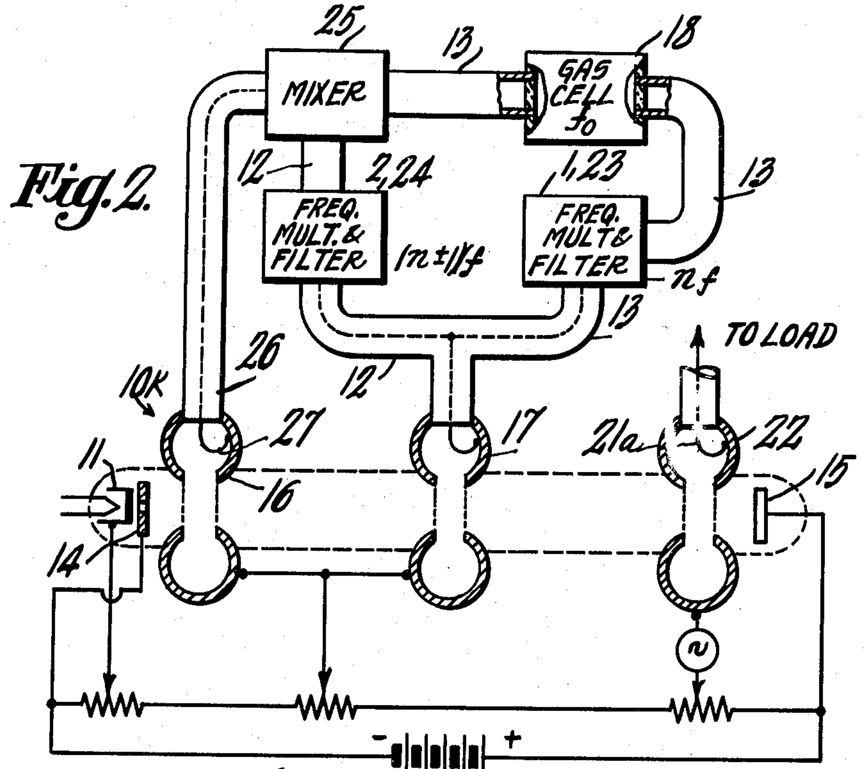
Figure 4:
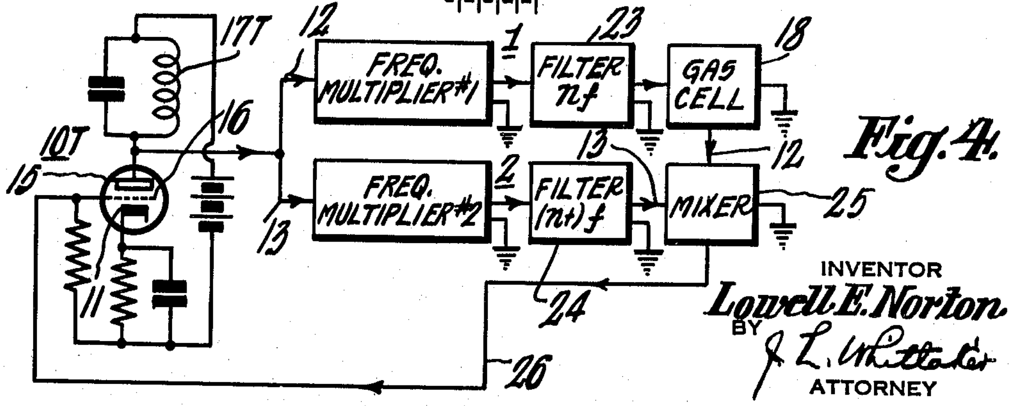
Figures 3, 5:
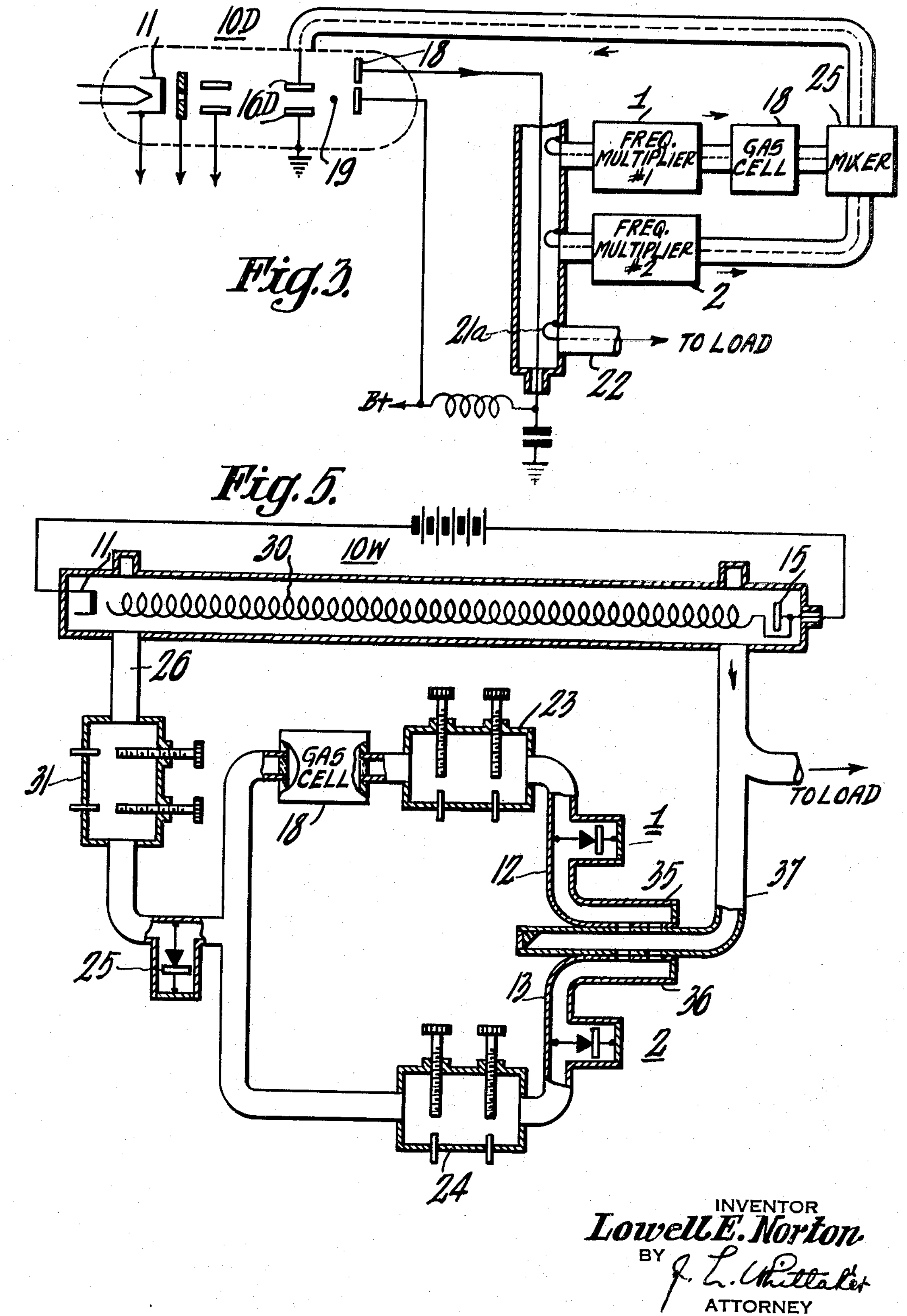
Figure 6:
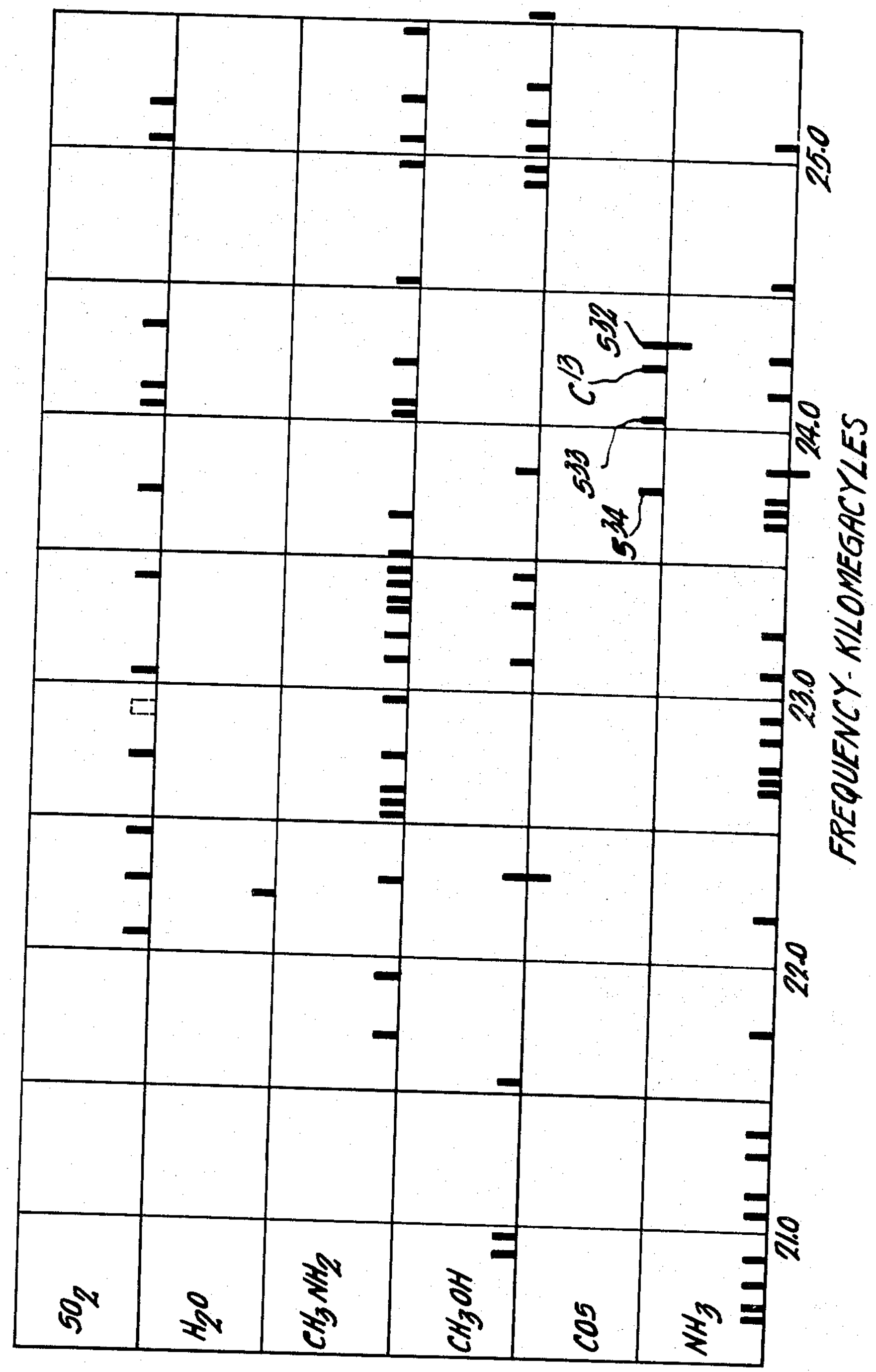

For a more detailed understanding of the invention and for illustration of various embodiments thereof, reference is made to the accompanying drawings in which:

Fig. 1 is a block diagram of a stabilized oscillator system;

Fig. 2 schematically illustrates a modification of Fig. 1 using a klystron oscillator tube;

Fig. 3 schematically illustrates a modification of Fig. 1 using a beam deflection tube;

Fig. 4 schematically illustrates a modification of Fig. 1 using a high-frequency triode;

Fig. 5 schematically illustrates a modification of Fig. 1 using a traveling wave tube; and Fig. 6 is a chart showing the absorption lines of various gases.

In brief explanation of phenomenon involved in preferred forms of the invention, various gases including $NH_3$, COS, $CH_3$, $NH_2$ and $SO_2$ exhibit selective absorption in the microwave region of the frequency spectrum. As more fully described in copending applications including the previously referred to parent application Serial No. 5,603 filed January 31, 1948 and now Patent No. 2,559,730, at low pressures of the order of $10^{-2}$ or $10^{-3}$ millimeters of mercury, the absorption region breaks up into a plurality of sharply defined lines, each precisely corresponding with a particular frequency. For example, the 3, 3 line of ammonia occurs at a wavelength of 1.25 centimeters (24 kilomegacycles), and with the gas at a pressure of 0.02 millimeter of mercury, or less, the effective Q of that gas line is upwards of 40,000; Q's as high as 100,000 are readily available with the gas confined in a length of waveguide or in a resonant cavity for use as a resonant circuit element or standard.

At frequencies of this order, it is also feasible to obtain a Q as high as 5,000 or more from a resonant cavity or chamber, but its resonant frequency, in absence of compensations difficult or impossible to achieve, is subject to variation with change of ambient conditions such as pressure or temperature, whereas the molecular resonant frequency of a gas line is substantially unaffected by any known factor except a strong magnetic or electric field which is easily avoided. For rigid stabilization at a precise frequency, it is therefore preferred that the frequency standard be a gas-absorption line.

The impedance change of a resonant circuit or element in the neighborhood of its resonant frequency ($f_0$) can be expressed as $$Z=Z_0\left(1-2i\frac{\Delta f_0}{f_0}\right) \quad (1)$$

where $Z_0$ has the dimensions of a resistance and $\Delta f$ is the incremental change of the impressed frequency.

The phase angle $\psi$ of the circuit or element near resonance may therefore be expressed as $$\tan \psi = -\frac{2\Delta f Q}{f_0} \quad (2)$$

the angle being leading or lagging for opposite senses of deviation from frequency $f_0$.

Consequently when the frequency standard is a chamber or cavity containing, at suitably low pressure, a gas exhibiting molecular resonance and so having a Q upwards of 50,000 or so, the phase angle $\psi$ of the equivalent impedance Z varies extremely rapidly with departure of the impressed frequency from the resonant frequency of the gas. For zero deviation of the impressed frequency, the phase angle $\psi$ is zero, but upon deviation of the impressed frequency from the molecularly resonant frequency of the gas the phase angle $\psi$ rapidly changes and in positive or negative sense depending upon the sense of the deviation.

Methods and arrangements for utilization of such phase shift in the feedback circuit of an oscillator stabilized at the gas line frequency (which frequencies as shown by the chart of Fig. 6 are in the range of thousands of megacycles) are disclosed and claimed in aforesaid patent application, Serial No. 5,603, filed January 31, 1948, now Patent No. 2,559,730.

In accordance with the herein claimed invention, such phase shift of the frequency impressed upon the gas is used to stabilize an oscillator operating at much lower frequency, which not only extends the range of oscillator frequencies which can be stabilized from gas lines, but also increases the rapidity at which the phase angle $\psi$ changes with deviation of oscillator frequency by a factor defined by the ratio of the standard frequency to the oscillator frequency.

More particularly, as generically exemplified by Fig. 1, the output from the oscillator 10 to be stabilized is impressed upon two harmonic generators or frequency multipliers 1, 2. At very high frequencies, the frequency multipliers may simply be crystal diodes, or, as also shown in applications herein referred to, may be of tube type. The filter 23 forming part of the frequency multiplier 1 or included in its output circuit selects the $n$th harmonic of the output frequency $f$ of oscillator 10 and the filter 24 similarly associated with multiplier 2 selects the next higher harmonic $(n+1)\,f$ or the next lower harmonic $(n-1)\,f$. The two channels 12, 13 respectively including the frequency multipliers 1, 2 and their associated filters form a pair of input circuits for a mixer 25. For very high frequencies, the mixer 25 may also be conveniently a crystal diode.

The difference frequency appearing in the output of mixer 25 is numerically equal to the oscillator frequency $f$ and is applied through a suitable transmission line or conductor 26 to complete the feedback loop of oscillator 10 for sustained generation of oscillations at frequency $f$. This difference frequency is $[(n+1)f-nf]$ or $$[nf-(n-1)f]$$

depending upon whether the harmonic selected by filter 24 or higher or lower than the harmonic $nf$ passed filter 23.

In one of the channels 12, 13 is included the gas cell 18 or other high-Q resonator: gas cells suited for purposes of the present invention are disclosed in copending application Serial No. 4,497 filed January 27, 1948, now Patent No. 2,702,351, and applications referred to therein. The steep slope of the dispersion-frequency of reactance-frequency characteristic of such frequency-standard at and near its resonant frequency is utilized rapidly to shift the phase of the impressed harmonic frequency upon deviation of the frequency $f$ of oscillator 10 from a selected one of the relations $$f=\frac{f_0}{n} \qquad (3)$$

$$f=\frac{f_0}{n+1} \qquad (4)$$

$$f=\frac{f_0}{n-1} \qquad (5)$$

where $f_0$ is the spectral line frequency, or standard frequency.

Preferably, and as shown, the gas cell 18 is included in the $nf$ channel so that Equation 3 applies and Equation 2 may be rewritten as $$(2A) \qquad \tan\psi=-2\frac{\Delta(nf)}{f_0}$$

where $\Delta(nf)$ is the incremental change of the $n$th harmonic oscillator frequency and $f_0$ is the selected molecular resonance frequency of the gas.

The difference-frequency in the output of mixer 25 contains the phase angle $\psi$ which rapidly changes with deviation of the selected harmonic frequency from correspondence with the resonant frequency $f_0$ of the gas cell 18 or equivalent. Thus, although the feedback loop of the oscillator is effectively closed at the operating frequency $f$ of the oscillator, the stabilization is effected at the substantially higher frequency impressed upon the gas cell standard. As appears from comparison of Equations 2 and 2A, the phase angle changes the more rapidly when the frequency impressed upon the standard is a harmonic of the oscillator frequency to be stabilized. In short, the stiffness factor is increased by the order of the harmonic.

By this method, any oscillator having an external feedback loop may be rigidly stabilized at a selected sub-harmonic of a gas line frequency and without need for an oscillator operating at the gas line frequency. When it is desired to stabilize the oscillator 10 at a frequency which is not an exact sub-harmonic of a gas line frequency, the desired offset may be obtained in manner described and claimed in copending applications Serial Nos. 224,002 filed May 1, 1951; and 218,807 filed April 2, 1951, to which reference is here made for such modification of the present invention.

As exemplary of application of the invention to various specific types of oscillators, reference is made to Figs. 2 to 5 respectively showing a klystron 10K, a beam deflection tube 10D, a high-frequency triode 10T and a traveling wave tube 10W.

Referring to Fig. 2, the klystron 10K comprises an electron gun including cathode 11 heated to produce a beam of electrons directed toward the anode 15. An accelerating electrode 14 is generically illustrative of the accelerating and focusing electrode structure disposed in or adjacent the path of the electron beam. In passing from the cathode 11 to the anode 15, the beam traverses the resonant cavities or chambers 16, 17, each provided with a pair of spaced grids to permit passage of the beam through cavities for their excitation. It is assumed that the dimensions of the cavities, the spacing between them and other circuit parameters are so chosen in accordance with known techniques that the tube oscillates at a frequency which is a selected sub-harmonic of a selected molecular resonance of a particular gas. Heretofore the frequency control was effected, once the cavities were adjusted to frequency, by varying the biasing voltage applied to cavity 16 so to control the transit time and the phase angle between the cavities; frequency-control may also be effected by change of grid biasing potential on a grid, not shown, inserted between the cavities 16 and 17. Such control was effected manually from time to time, or automatically as by thermal-responsive devices, but was ineffective continuously to maintain a precise frequency.

In a beam deflection tube 2 the effect of a small deviation of frequency $f$ of the generated oscillations upon the phase angle $\theta$ of the beam or driving current may be expressed as $$\frac{\Delta f}{f_i}=-\frac{1}{2Q_3}\tan\Delta\theta \qquad (6)$$

where $Q_3$ is the loaded Q of output cavity 17, angle $\theta$ is the ratio of the voltage across the cavity 17 to its driving current; $\Delta\theta$ is the incremental change of the angle $\theta$; and $\Delta f$ is the incremental change of frequency $f_i$, $f_i$ is the initial frequency.

Therefore, any change in transit angle of the beam produced by change of any ambient or operating condition of the tube may be expressed as $$\tan\Delta\theta=-2\frac{\Delta f}{f_i}Q_3 \qquad (7)$$

From comparison of Equations 2 and 7, it appears that any incremental change of phase angle $\psi$ introduced in the feed-back path has, in kind, the same effect upon an incremental change of frequency as the incremental angle $\Delta\theta$ of the beam impedance. However, as the angle $\psi$ (Equation 2A) changes much more rapidly than $\theta$, mainly because the spectral line or control standard value of Q is much greater than the loaded Q, $Q_3$, of the oscillator but also, in addition, because of the effect of $n$, the selected harmonic, its effect is of correspondingly increased magnitude.

As the effects are made to be in opposition, the oscillator frequency is stabilized when the ratio of the product of the Q of the standard 18 times the order of the selected harmonic to the Q of the cavity 17 is substantially greater than 1. Assuming, as shown in Fig. 2, that the gas cell is in the *nf* channel, this relation may be more simply expressed as $$\frac{nQ}{Q_3} \gg 1 \qquad (8)$$

From the above considerations, it is apparent that when the product *n*Q, the effective Q of the frequency standard 18, is substantially greater than the effective loaded Q of the tube cavities 16, 17, and particularly that of cavity 17 when coupled to a load circuit, the external phase shifter or standard 18 is effective to compensate for any condition which may tend to shift the frequency of the oscillator because the angle $\psi$ of the external phase shifter or standard 18 varies far more rapidly with frequency than $\Delta\theta$ of cavity 17. Although any high-Q phase shifter, such as high-Q resonant cavity, may be used, it is especially advantageous to utilize molecular resonance of a gas, as this provides not only a circuit element of extremely high Q, as above explained but also a frequency standard of the highest absolute frequency precision. Where such precision is not essential, the gas may be omitted from gas chamber 18 but in such case the Q of the chamber itself, as multiplied by the order of the selected harmonic, must be substantially higher than the effective Q of cavity 17 to satisfy Equation 8.

The klystron 10K may be provided with cavities in addition to cavities 16 and 17 for such purposes as frequency multiplication or modulation or for coupling to the load circuit, although the system will operate with only cavities 16, 17. For example, the cavity 22, Fig. 2, provided for any of these purposes, is distinct from cavities 16 and 17 utilized for generation of oscillations. Such additional cavity or cavities should be disposed in the path of the electron beam beyond the feedback cavities 16—17, that is, the additional cavity or cavities should be more remote from the cathode 11 than the feedback cavities, and in any event should not be between cavities 16 and 17.

The frequency-stabilizing network or feedback loop is coupled between the cavity resonators 17 and 16 to utilize in accordance with Fig. 1 the rapidly varying reactive characteristics of a gas in response to microwave energy transmission through the gas cell 18. Energy at the operating frequency *f* of the klystron oscillator is derived from cavity resonator 17 and applied to a pair of frequency multipliers (1, 23) and (2, 24) from which signals at harmonic frequency *nf* and $(n\pm1)f$ are respectively selected. Signals of the harmonic *nf* and either of the harmonics $(n+1)f$ or $(n-1)f$ so derived from the frequency multipliers are applied to a mixer 25 such as a crystal diode from whence the operating frequency component *f* is derived as a difference frequency of the two harmonics. The mixer is connected through a line 26 and a coupling loop 27 or equivalent to feed back energy at frequency *f* into the first cavity resonator 16 for sustained generation of oscillation of frequency *f*.

In order to control the phase of the feedback energy between the cavity resonators 17—16, the gas cell 18 is serially coupled between either of the frequency multipliers and the mixer 25. In the particular arrangement shown in Fig. 2, it is serially included in the *nf* channel, and since the operating frequency *f* is a sub-multiple of the sharp molecular resonant frequency $f_0$ of the gas cell, the cell provides a most steep or critical reactance-frequency characteristic in the frequency region near *nf*. If the value of the generated frequency *f* tends to vary, the reactive effect of the gas cell rapidly varies the phase of the feedback energy at impressed frequency *nf*, thus providing a feedback signal whose phase rapidly changes for correction of any tendency of the generated frequency *f* to vary.

If desired, the output circuit of mixer 25 may include a filter (not shown in Fig. 2) to reject all output components except the difference frequency *f*, but ordinarily such other components have no deleterious effect upon the feedback network. Also, the lines coupling the frequency multipliers to mixer 25 may include directional couplers, filters or like devices for preventing any undesired interaction therebetween.

The invention may also be applied to stabilize the frequency of a microwave oscillator using a beam deflection tube 10D, Fig. 3, whose construction may be the same or generally similar to that shown in application Serial No. 759,769, filed July 9, 1947, now Patent No. 2,551,818. Briefly, the electron beam issuing from the gun including cathode 11 passes between a pair of electrodes 16D subjected to an alternating difference of potential from the feedback loop which includes high-Q phase shifter 18, preferably a gas cell. The frequency multipliers 1 and 2 are effectively coupled to the circuit of the output electrode 15 of the tube to produce, as discussed in connection with preceding figures, the harmonic *nf* and one or the other of the harmonics $(n+1)f$, $(n-1)f$. One of these harmonics, preferably *nf*, is impressed upon the gas cell 18 and thereafter the harmonics are combined in the mixer 25 to produce the frequency *f* as a difference frequency which contains the phase shift imparted by the molecular resonance characteristic of the gas if there be any deviation of the oscillator frequency from the relation defined in the selected one of Equations 3 to 5. This difference frequency feedback is applied to the input deflection plates 16D, effective as in other oscillators of this type, periodically to deflect the beam across the thin wire electrode 19 periodically to strike the output electrode 15 and so provide a series of timed impulses which through the feedback path provide for sustained generation of oscillations. A unidirectional biasing voltage, not shown, is applied, as to the deflection plates, so that the beam impinges upon electrode 15 only once per cycle.

By such application of the invention, gas resonances are made available for stabilization of the frequency of a beam deflection tube oscillator.

The invention may also be utilized to stabilize the frequency of a high-frequency triode 10T, Fig. 4, such as for example, the BTL–1553, WE–416A tubes suitable for operation at frequencies as high as 5,000 megacycles. The anode or output circuit 17T of tube 10T is tuned to the operating frequency *f*: at the higher frequencies, the lumped inductance and capacity shown in Fig. 4 would be replaced by a resonant cavity, waveguide or transmission line counterpart. The anode or output circuit is suitably coupled in any known manner to the channels 11 and 12 of the feedback loop, which channels as in the modifications previously described include a pair of harmonic generators or frequency multipliers 1, 2 for producing the harmonic frequency *nf* and the next higher or lower harmonic. One of these higher frequency-derived components, preferably the *nf* component, is applied to a gas cell 18 or other high-Q resonator whose resonant frequency $f_0$ coincides with the frequency of the selected harmonic when the oscillator is operating at the desired frequency. Upon the departure of the oscillator frequency from the desired value, its harmonic *nf*, during its passage through the gas cell 18, is subjected to a phase shift due to the dispersion-frequency characteristic of the gas. This component or signal is applied together with the other selected harmonic to the mixer 25, so to produce a feedback potential at frequency *f*, the difference frequency of these two harmonics. This difference-frequency is applied by the line or conductor 26 to the grid 16 of the triode. Thus, as in the other modifications, the feedback loop is closed for the operating frequency *f* of the oscillator, although the stabilization is effected at the higher standard frequency $f_0$ which is preferably a selected molecular resonance frequency of gas in cell 18.

The invention may also be applied, as shown in Fig. 5 to stabilize the frequency of oscillations generated by a traveling-wave tube 10W which may be generally similar in construction to that discussed in British Patent 628,570 and in the Proceedings of I. R. E., February 1947, pages 124–127 and 108–111. Briefly, this type of tube includes an electron gun having a cathode 11 providing an electron beam extending to the collector electrode 15. A helical electrode 30 disposed between the anode and collector electrodes adjacent the path of the electron beam serves as a guide for the traveling wave and produces bunching of electrons in the beam. The feedback loop, as shown in Fig. 5, is effectively coupled to the spiral electrode and/or to the electron beam at spaced points between the cathode and collector anode, at which points there are preferably provided resonant chambers schematically illustrated.

Output energy from the tube at operating frequency $f$ is fed to the two channels 12 and 13 respectively including the frequency multipliers 1, 2 which, as shown, may simply be crystal diodes. In the particular arrangement shown in Fig. 5, the channels 12, 13 respectively include the directional couplers 35, 36 connected to the output waveguide 37 of tube 10W. The filters 23 and 24, which may be generally of the type discussed in copending application Serial No. 693,506 filed August 28, 1946, now Patent No. 2,594,037, are included in the output circuits of the frequency multipliers to select the $n$th harmonic and the next lower or higher harmonic. A selected one of these harmonics, specifically the $n$th harmonic, is applied to a gas cell 18 containing ammonia or other molecularly resonant gas at suitably reduced pressure.

Thus, as in the other modifications, the selected harmonic in passing through the gas cell is subject to a phase shift if the harmonic frequency does not coincide with the resonant frequency $f_0$ of the gas. The phase angle rapidly changes in sense dependent upon the sense of deviation of the oscillator frequency and at a rapid rate due to the sharp molecular resonance of the gas and because of the fact that the oscillator frequency is multiplied before impression upon the gas (Equation 2A).

After the selected harmonic has passed through the gas cell, it, together with the other selected harmonic, is applied to the mixer 25, which, as shown, may be a crystal diode to produce the difference frequency numerically equal to the operating frequency of the oscillator and containing the phase shift imparted by the gas. This feedback signal is applied by waveguide 26 or similar line to the electron beam or traveling wave at a suitable point for sustained generation of oscillations. If desired, the line 26 may include a filter 31 for attenuating output components of the mixer 25 other than those of frequency $f$ although, as above stated in discussion of Fig. 2, such filter may ordinarily be omitted.

The modification shown in Fig. 2 is shown in copending application Serial No. 140,813, filed January 27, 1950, now abandoned, and in application Serial No. 218,807, filed April 2, 1951; the modification shown in Fig. 3 was originally shown as Fig. 5 of application Serial No. 5603, filed January 31, 1948, now Patent No. 2,559,730, and is Fig. 4 of the abandoned application mentioned above, Serial No. 140,813, filed January 27, 1950. Other arrangements for stabilizing a klystron oscillator from a higher gas line frequency are shown in copending applications Serial Nos. 218,807, filed April 21, 1951, and 224,002, filed May 1, 1951.

From the foregoing general discussion and specific examples, it shall be understood that invention is not limited to the particular arrangements shown and is of scope defined by the appended claims.

What is claimed is:

1. Apparatus for stabilizing the frequency of oscillations of a generator comprising means for multiplying said oscillation frequency, a high Q frequency standard having a resonant frequency at a multiple of said oscillation frequency, means for passing a first portion of said multiplied frequency oscillations at said multiple frequency through said standard to derive an output signal varying in phase as a function of variations of said passed frequency with respect to said resonant frequency of the standard, means for deriving a second output signal from said generator at a frequency differing in frequency from said first output signal by said oscillation frequency, means for combining said two output signals to derive a control signal of the same frequency as said generator frequency and varying in phase as a function of said generator oscillations signal phase variations, and means for applying said control signal to said generator to stabilize the frequency of said generated oscillations.

2. Apparatus for stabilizing the frequency of oscillations of a generator comprising means for multiplying by an integer greater than unity said oscillation frequency, a body of gas exhibiting molecular resonance, means for applying a first portion of said multiplied frequency oscillations at the gas resonance frequency to said gas to derive an output signal varying in phase as a function of variations of said passed frequency with respect to the molecular resonant frequency of said gas, means for deriving a second signal from said generator differing in frequency from that of said output signal by said generator frequency, means for combining said output signal with said second signal to derive a control signal of the same frequency as said generator frequency and varying in phase as a function of said output signal phase variations, and means for applying said control signal to said generator to stabilize the frequency of said generated oscillations.

3. Apparatus for stabilizing frequency comprising a multi-cavity klystron generator, means coupled to one of said generator cavities for deriving a first signal, means for multiplying by an integer greater than unity said output signal frequency, a body of gas exhibiting molecular resonance, means for applying a first portion of said multiplied frequency signal to said gas to derive an output signal varying in phase as a function of variations of said passed frequency with respect to a molecular resonant frequency of said gas, means for deriving from said klystron generator a second output signal differing in frequency from said first output signal by the frequency of said klystron generator, means for combining said output signals to derive a control signal to control said generator frequency and varying in phase as a function of said first output signal phase variations, and means for applying said control signal to stabilize the frequency of said generated oscillations.

4. Apparatus for stabilizing frequency comprising a multi-cavity klystron generator, means coupled to one of said generator cavities for deriving output signals, means for multiplying by an integer greater than unity said output signal frequency, a body of gas exhibiting molecular resonance, means for applying a first portion of said multiplied frequency signals to said gas to derive other signals varying in phase as a function of variations of said applied frequency with respect to a molecular resonant frequency of said gas, means for modulating said signal derived from said gas with another frequency multiplied portion of said generated signal to derive a control signal of the same frequency as said generator frequency and varying in phase as a function of said gas derived signal phase variations, and means for applying said control signal to stabilize the frequency of said generated oscillations.

5. Apparatus stabilizing frequency comprising a beam deflection oscillation generator including beam deflection means and beam collecting means, means coupled to said collecting means for deriving a signal of said oscillation frequency, means for multiplying by an integer greater than unit said oscillation frequency, a body of gas exhibiting molecular resonance, means for applying a first portion of said multiplied frequency oscillations to said gas to derive an output signal varying in phase as a function of variations of said applied frequency with respect to a molecular resonant frequency of said gas, means for combining said output frequency signal with another frequency multiplied portion of said generated signal to derive a control signal of the same frequency as said generator frequency and varying in phase as a function of said output signal phase variations, and means for applying said control signal to said beam deflection means to stabilize the frequency of said generated oscillations.

6. Apparatus stabilizing frequency comprising a beam deflection oscillation generator including beam deflection means and beam collecting means, means coupled to said collecting means for deriving a signal of said oscillation frequency, means coupled to receive and for multiplying by an integer greater than unity the frequency of said oscillation frequency signal, a body of gas exhibiting molecular resonance, means for passing a first portion of said multiplied frequency signal through said gas to derive an output signal varying in phase as a function of variations of said passed frequency with respect to a molecular resonant frequency of said gas, means coupled to receive and to multiply another portion of said oscillation frequency signal, means for modulating said output signal with the last mentioned frequency multiplied portion of said generated signal to derive a control signal of the same frequency as said generator frequency and varying in phase as a function of said output signal phase variations, and means for applying said control signal to said beam deflection means to stabilize the frequency of said generated oscillations.

7. Apparatus for stabilizing frequency comprising a high-frequency oscillator tube having anode and grid electrodes, means coupled to the anode electrode for deriving a signal of oscillation frequency, means coupled to receive and for multiplying said oscillation frequency, a body of gas exhibiting molecular resonance, means for passing a first portion of said multiplied frequency oscillations through said gas to derive an output signal varying in phase as a function of variations of said passed frequency with respect to a molecular resonant frequency of the gas, means for deriving from said oscillator tube a second output signal differing in frequency from said first output signal by the frequency of said oscillation frequency signal, means for combining said output signals to derive a control signal of said oscillation frequency varying in phase as a function of said first output signal phase variations, and means for applying said control signal to said grid electrode to stabilize the frequency of said first generated oscillations.

8. Apparatus for stabilizing frequency comprising a traveling wave tube having a travelling wave electrode adjacent the path of the electron beam extending from a cathode to a collector electrode, means effectively coupled to the path adjacent the collector electrode for deriving signal of oscillation frequency, means for multiplying said oscillation frequency, a body of gas exhibiting molecular resonance, means for passing a first portion of said multiplied frequency oscillations through said gas to derive an output signal varying in phase as a function of variations of said passed frequency with respect to a molecular resonant frequency of the gas, means coupled to receive and multiply another portion of said oscillation frequency signal, means for combining said output signal with the frequency multiplied signal from said last mentioned means to derive a control signal of the same frequency as said oscillation frequency and varying in phase as a function of said output signal phase variations, and means for effectively applying said control signal to said path in advance of said collector to stabilize the frequency of said generated oscillations.

9. Apparatus for stabilizing the frequency $f$ of oscillations of a generator having a feedback loop which comprises means for multiplying said oscillation frequency $f$ to derive a first signal of frequency component $nf$, means for deriving a second signal of frequency component $(n+1)f$ or $(n-1)f$, where $n$ is an integer greater than one, a body of gas exhibiting molecular resonance, means for applying one of said signals to said gas, means for deriving from said gas an output signal varying in phase as a function of frequency variations in said applied signal with respect to a molecular resonant frequency of said gas, means for combining said output signal with said second signal, means for deriving from said combined signals a feedback signal of frequency $f$ varying in phase as a function of frequency shift in said generated oscillations, and means for applying said feedback signal to stabilize said generated oscillation frequency.

10. Apparatus for stabilizing the frequency $f$ of oscillations of a multi-cavity klystron oscillation generator having a feedback loop between two of said cavities thereof, comprising means for deriving a signal of frequency $f$ from one of said cavities, means to frequency multiply said signal of frequency $f$ to derive a signal of frequency component $nf$, where $n$ is greater than unity, means to frequency multiply said signal of frequency $f$ to derive a signal of one of the frequency components $(n+1)f$ and $(n-1)f$, a body of gas exhibiting molecular resonance, means for applying to said gas one of said signals derived by frequency multiplication, means for deriving from said gas as a result of the signal applied thereto an output signal varying in phase as a function of frequency variations in said applied signal with respect to a molecular resonant frequency of said gas, means for combining said output and the other of said frequency multiplication derived signals, means for deriving from said combined signals a feedback signal of frequency $f$ varying in phase as a function of frequency shift in said generated oscillations, and means for applying said feedback signal to another of said cavities to stabilize said generated oscillation frequency.

11. Apparatus for stabilizing the frequency $f$ of oscillations of a beam deflection oscillation generator having beam deflection means and beam collecting means, comprising means for deriving a signal of oscillation frequency $f$ from said collecting means, means for multiplying said oscillation frequency signal to derive an output signal with frequency component $nf$, where $n$ is greater than unity, means for multiplying said oscillation frequency signal to derive an output signal with one of the frequency components $(n+1)f$ and $(n-1)f$, a body of gas exhibiting molecular resonance, means for applying one of said output signal components to said gas, means for deriving from said gas signals varying in phase as a function of frequency variations in said applied signal with respect to a molecular resonant frequency of said gas, means for combining said gas derived signal with the other of said output signals, means for deriving from said combined signals a feedback signal of frequency $f$ varying in phase as a function of frequency shift in said generated oscillations, and means for applying said feedback signal to said deflection means to stabilize said generated oscillation frequency.

12. Apparatus for stabilizing the frequency $f$ of oscillations of a high-frequency oscillator tube having anode and grid electrodes, comprising means for deriving an oscillation frequency signal from said anode electrode, means for multiplying said signal of oscillation frequency $f$ to derive a signal of frequency component $nf$ and to derive a signal of one of the frequency components $(n+1)f$ and $(n-1)f$, where $n$ is an integer greater than unity, a body of gas exhibiting molecular resonance, means for applying one of said multiplied signal components to said gas, means for deriving from said gas a signal varying in phase as a function of frequency variations in said applied signals with respect to a molecular resonant frequency of said gas, means for combining said gas derived signal with another of said multiplied signals, means for deriving from said combined signals a feedback signal of frequency $f$ varying in phase as a function of frequency shift in said generated oscillations, and means for applying said feedback signal to said grid electrode to stabilize said generated oscillation frequency.

13. Apparatus for stabilizing the frequency $f$ of oscillations generated by a traveling wave tube having a cathode, a collector and a traveling wave electrode adjacent the beam path from cathode to collector, comprising means effectively coupled to said path adjacent the collector for deriving a signal of oscillation frequency, means for frequency multiplying said signal of oscillation frequency $f$ to derive a signal of frequency component $nf$ and a signal of one of the frequency components $(n+f)f$ and $(n-1)f$, where $n$ is an integer greater than unity, a body of gas exhibiting molecular resonance, means for applying one of said multiplied frequency signals to said gas, means for deriving from said gas signals varying in phase as a function of frequency variations in said applied signals with respect to a molecular resonant frequency of said gas, means for combining said gas derived signal with the other of said frequency multiplied signals, means for deriving from said combined signals a feedback signal of frequency $f$ varying in phase as a function of frequency shift in said generated oscillations, and means for effectively applying said feedback signal to said path in advance of said collector to stabilize said generated oscillation frequency.

14. A system for stabilization of the frequency $\omega_s$ of a klystron oscillator comprising a comparator having two input circuits from a cavity of the klystron and an output circuit to another cavity of the klystron one of said input circuits includng a frequency multiplier for increasing the frequency by a factor $m$ to a frequency substantially $\omega_g$, $m$ being greater than unity, and a chamber containing at reduced pressure a gas exhibiting molecular resonance at frequency $\omega_g$ and the other of said input circuits including a frequency multiplier for increasing the frequency by a factor $m+1$, said circuits providing a feedback loop between said cavities for stabilization of the oscillator frequency $\omega_s$ at the value $$\frac{\omega_g}{m}$$

15. A system for providing a stabilized frequency comprising a klystron having a feedback loop between cavities thereof, said feedback loop comprising a comparator having two input circuits from one of said cavities and an output circuit to the other of said cavities, one of said input circuits including a multiplier for increasing the klystron frequency by a factor $m$ to the frequency substantially $\omega_g$, $m$ being greater than unity, and a chamber exhibiting molecular resonance at frequency $\omega_g$ and the other of said input circuits including a frequency multiplier for increasing the klystron frequency by a factor $m+1$ whereby the lower frequency oscillations are stabilized at a value whose sole or major term is $$\frac{\omega_g}{m(n+1)}$$

References Cited in the file of this patent

UNITED STATES PATENTS

| | | |
|---|---|---|
| 1,978,818 | Roosenstein | Oct. 30, 1934 |
| 2,265,796 | Boersch | Dec. 6, 1941 |
| 2,444,928 | Harrison | July 13, 1948 |
| 2,457,673 | Hershberger | Dec. 28, 1948 |
| 2,464,818 | Learned | Mar. 22, 1949 |
| 2,475,074 | Bradley | July 5, 1949 |
| 2,560,365 | Norton | July 10, 1951 |